(12) United States Patent
Sherrets et al.

(10) Patent No.: US 9,591,050 B1
(45) Date of Patent: Mar. 7, 2017

(54) IMAGE RECOMMENDATIONS FOR THUMBNAILS FOR ONLINE MEDIA ITEMS BASED ON USER ACTIVITY

(71) Applicant: GOOGLE INC., Mountain View, CA (US)

(72) Inventors: Doug Sherrets, San Francisco, CA (US); Benjamin David Eidelson, San Francisco, CA (US); Jason Toff, San Francisco, CA (US); Jason Prado, San Francisco, CA (US); Sean Liu, El Dorado Hills, CA (US); Karen Kavett, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 285 days.

(21) Appl. No.: 13/781,255

(22) Filed: Feb. 28, 2013

(51) Int. Cl.
  G06F 15/16 (2006.01)
  H04L 29/08 (2006.01)
(52) U.S. Cl.
  CPC .................................. H04L 67/02 (2013.01)
(58) Field of Classification Search
  CPC ........................... G06Q 30/0242; H04L 67/02
  USPC ....................................................... 709/204
  See application file for complete search history.

(56) References Cited

U.S. PATENT DOCUMENTS

| | | | |
|---|---|---|---|
| 2007/0038516 A1* | 2/2007 | Apple et al. | 705/14 |
| 2008/0163071 A1* | 7/2008 | Abbott et al. | 715/748 |
| 2009/0210779 A1 | 8/2009 | Badoiu et al. | |
| 2014/0068433 A1* | 3/2014 | Chitturi | H04N 21/41407 715/716 |
| 2014/0114745 A1 | 4/2014 | Bruich et al. | |

OTHER PUBLICATIONS

Non-Final Office Action for U.S. Appl. No. 13/781,268, dated Dec. 14, 2015, 26 pages.
Final Office Action for U.S. Appl. No. 13/781,268, dated Jun. 10, 2015, 23, pages.
Non-Final Office Action for U.S. Appl. No. 13/781,268, dated Feb. 26, 2015, 22 pages.

* cited by examiner

Primary Examiner — Kevin Mai
(74) Attorney, Agent, or Firm — Lowenstein Sandler LLP

(57) ABSTRACT

A computer system collects user activity data for an online media item. The user activity data includes data for users that are consuming the online media item. The computer system identifies one or more criteria that are associated with the user activity data to use to identify one or more images in the online media item for a thumbnail for the online media item and selects one or more images in the online media item, based on the user activity data, that satisfy the one or more criteria. The computer system recommends the one or more images as the thumbnail for the online media item.

20 Claims, 10 Drawing Sheets

IMAGE RECOMMENDATIONS FOR THUMBNAILS FOR ONLINE MEDIA ITEMS BASED ON USER ACTIVITY

TECHNICAL FIELD

The present disclosure relates to online media items and, more particularly, to a technique of recommending images for thumbnails for online media items based on user activity.

BACKGROUND

Users may create and publish videos online, which others users may watch. Users may select which video to watch, for example, by selecting a thumbnail of the video. A thumbnail is a reduced-size version of a digital image. Thumbnails may be implemented, for example, on web pages and/or in applications (e.g., web browser, mobile application) as smaller copies of an original digital image. Poor selection of a thumbnail can affect video click rate and consumption rate, which may be factors in generating revenue through the video.

For example, a video may be of a celebrity interview and an image of the face of the celebrity may be used as the thumbnail for the video. Some thumbnails may not be the best representation of the content of the video. For example, instead of using an image of the face of the celebrity as the thumbnail for the video, an image of the reporter who is interviewing the celebrity may be used. Videos that have a thumbnail of the reporter may not be selected as much as videos that have a thumbnail of the celebrity. In another example, a video may be of a high school marching band playing the latest hit song by a popular rock band. The video may be using an image of the rock band as a thumbnail, which many users may be selecting. Upon selection, users may realize that the video is not a performance of the rock band, and users may immediately stop watching the video. Although the high school marching band video may have a high click rate using the rock band image as a thumbnail, the high school marching band video has a low consumption rate.

Another example of a common problem today with thumbnail images misrepresenting the content of the video may be that an image may indicate that a video is a music video, when in fact the video is the image accompanied by a song playing while the image is shown. In another example, a user may select an image that implies that there is more action, which relates to the image, to be seen from the video. For example, an image of a football receiver catching a ball can imply that the video immediately shows the catch when the video is selected. The video may not immediately show the football receiver catching the ball and a user may have to navigate through the content of the video to locate the content of the football receiver catching the ball.

In another example, a user may select an image of a famous retired basketball player with an expectation that much of the video content includes the famous retired basketball player. The image may be misleading in that the famous retired basketball player is briefly included in the video content and the video content largely includes clips of current basketball players. In another example, a user may select an image of a flood, but the video content is mostly a news reporter talking about the weather with a brief showing of the flood. In another example, the image for the thumbnail may not be included the video content at all. The opposite scenarios of these examples may also occur. For example, a famous retired basketball player may appear prominently in a video, but the thumbnail may not include the famous retired basketball player. Poor representation of the video content in a thumbnail image may lead to missed opportunities for users to find the videos which the users may want.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system to recommend one or more images for thumbnails for online media items based on user activity relating to the online media items is described. The method includes collecting user activity data for an online media item. The user activity data includes data for users that are consuming the online media item. The method includes identifying one or more criteria that are associated with the user activity data to use to identify one or more images in the online media item for a thumbnail for the online media item, selecting one or more images in the online media item, based on the user activity data, that satisfy the one or more criteria, and recommending the one or more images as the thumbnail for the online media item.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
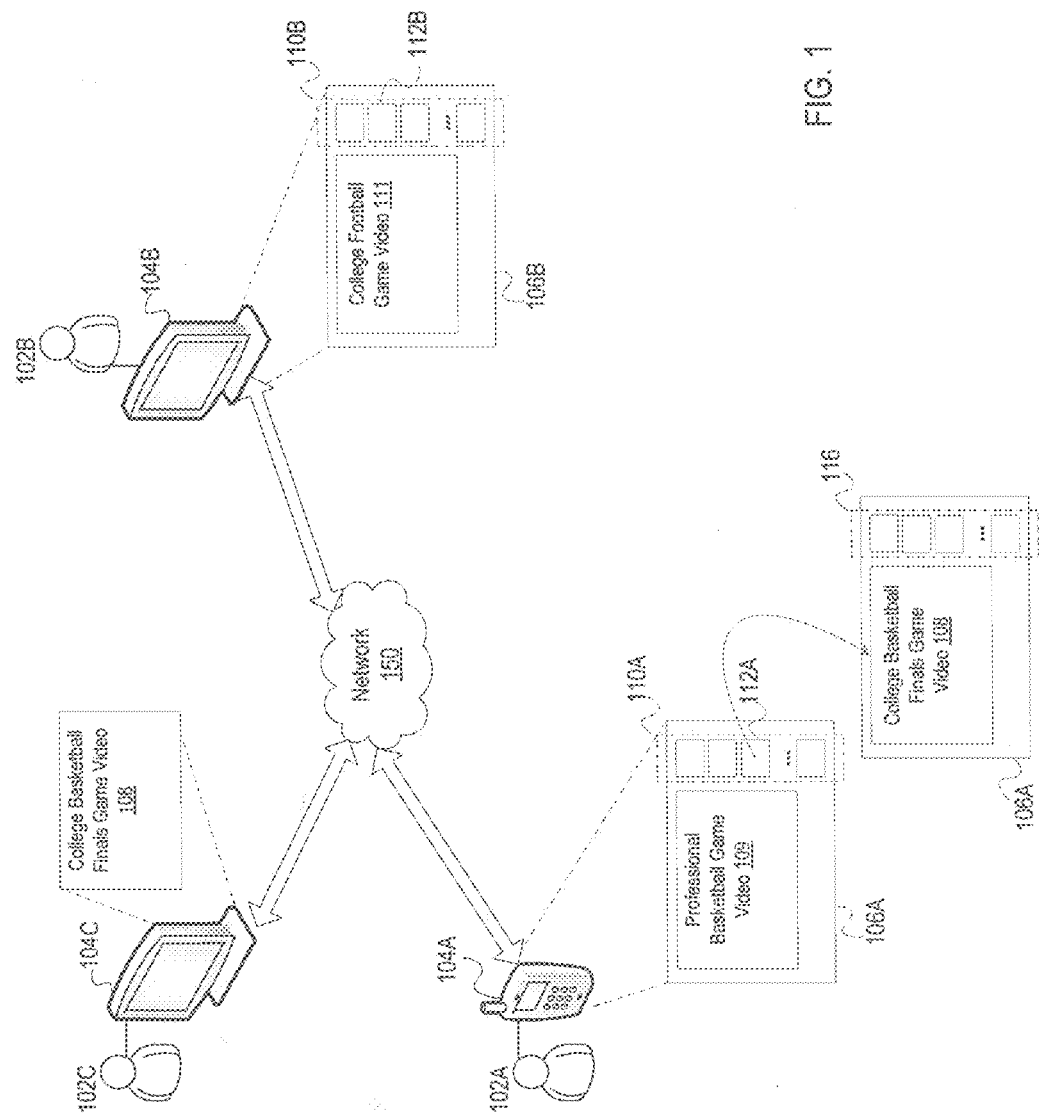
FIG. 1 illustrates client devices that can advantageously utilize various aspects in accordance with one or more implementations.

A system and method for recommending one or more images for thumbnails for an online media item based on user activity data is described. Examples of media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. An online media item can be a media item that is consumed via an application (e.g., web browser, mobile application, etc.) over a network. Consuming a media item can include, for example, and is not limited to, watching a media item, listening to a media item, editing a media item, etc. For example, a user may watch a video, edit a photo, listen to music, read a blog, etc. For brevity and simplicity, an online video is used as an example of an online media item throughout this document. An online video is also hereinafter referred to as a video.

A thumbnail is a digital image representing an online media item (e.g., video). A thumbnail can be the same size as the digital image representing the online media item (e.g., video) or a different size from the digital image representing the online media item. Thumbnails may be implemented, for example, in applications (e.g., web browser, mobile application) as smaller copies of an original digital image. For example, a video may be segmented and one of the images in a segment may be used as a thumbnail for the video. For example, a video may be of an interview of a professional athlete, and an image of the athlete's face taken from a segment of the video may be used as the thumbnail for the video. A thumbnail can include multiple images. For example, a video may include a basketball game and the winning celebration following the basketball game. A thumbnail for the video may be made up of a digital image of a referee, a digital image of the game winning shot, and a digital image of the celebration afterwards.

Users may create and publish online videos. Publishing of an online media item can include, for example, making the online media item available to users over a network via an application (e.g., web browser, mobile application, desktop application, television application, gaming console application, etc.). Users may select which video to watch, for example, by selecting a thumbnail of the video.

Implementations of the present disclosure can recommend one or more images for use as a thumbnail for an online media item by taking into account the activity of various users associated with the online media item. For example, a computer system identifies an online media item to analyze for a thumbnail recommendation and collects user activity data for the online media item. The user activity data includes data for users that are consuming the online media item. The computer system identifies one or more criteria that are associated with the user activity data to use to identify one or more images in the online media item for a thumbnail for the online media item and selects one or more images in the online media item, based on the user activity data, that satisfy the one or more criteria. The computer system recommends the one or more images as the thumbnail for the online media item. For example, the computer system may determine which segments of a video are most watched by users and may recommend an image from one of the most watched segments as the thumbnail for the video.

FIG. 1 provides an illustration of providing a thumbnail recommendation for an online media item based on user activity, in accordance with various implementations. As used herein, "media," "media item," "digital media," and a "digital media item" can include an electronic file that can be executed or loaded using software, firmware or hardware configured to present the digital media item to a user. A digital media item may include a single work or a collection of works. For example, a digital media item may include a video clip or an entire video. In another example, a digital media item may include a single song or an entire album. In another example, a digital media item may include a single book, or an anthology. Additionally, a single digital media item may include, for example, an audio portion (e.g., a music album) and a written word portion (e.g., an electronic publication).

For brevity and simplicity, a video is used as an example of an online media item. A user (e.g., User-C 102C) can create a video, such as a college basketball finals game video 108, and can upload the college basketball finals game video 108 to, for example, the Internet, using a client device 104C. The college basketball finals game video 108 may be of the last three minutes of a close scoring college basketball finals championship game. A user (e.g., User-C 102C) that creates and uploads a video (e.g., video 108) is hereinafter referred to as a "content owner." The content owner (e.g., User-C 102C) can use an application, such as a web browser or a mobile application, on a client device 104C to upload the video (e.g., college basketball finals game video 108).

The content owner (e.g., User-C 102C) may have a history of using images, which may not accurately represent the content of the videos, as thumbnails for the videos. Implementations of the present disclosure can suggest one or more images to use as a thumbnail (e.g., thumbnail 112A-B) for a video (e.g., college basketball finals game video 108) based on user activity relating to the video. The video (e.g., college basketball finals game video 108) can initially be assigned a pre-selected image for use as the thumbnail. For example, the pre-selected image may be an image from the first few seconds of video. For example, the college basketball finals game video 108 may start with an image of a referee, and the referee image may be used as the pre-selected image for use as the thumbnail for the college basketball finals game video 108.

The content owner (e.g., User-C 102C) can use the application to publish the video to allow other users (e.g., User-A 102A, User-B 102B) to consume (e.g., watch) the video on other user devices 104A-B via the network 150. Implementations of a client device (e.g., client devices 104A-C) are described in greater detail below in conjunction with FIG. 2. Implementations of a network (e.g., network 150) are described in greater detail below in conjunction with FIG. 2.

For example, a web browser or mobile application can provide User-A 102A with a graphical user interface (GUI) 106A that may include a target video (e.g., professional basketball game video 109) which User-A 102A is watching via client device 104A. The GUI 106A can also include a set of thumbnails for suggested videos 110A. One of the suggested videos may be the college basketball finals game video 108, which may be represented by the thumbnail 112A of the referee image. User-A 102A may select thumbnail 112A and the GUI 106A can include the college basketball finals game video 108 as the new target video and a new set of thumbnails for suggested videos 116. The user activity data of User-A 102A relating to the college basketball finals game video 108 can be collected and stored in one or more logs. In one implementation, a client device (e.g., client devices 104A-C) notifies users (e.g., users 102A-C) of the types of information that are stored in logs and data stores and transmitted to a server, and provides the user the opportunity to choose not to have such information collected and/or shared with the server.

One example of user activity data can include, and is not limited to, "like" data. Like data can describe one or more points in time in the online media item where the online media item is marked as "like" or "dislike," for example, by a user. The user activity data can be collected for any numbers of users. Examples of user activity data are described in greater detail below in conjunction with FIG. 2. One implementation of collecting user activity data is described in greater detail in conjunction with FIG. 2.

For example, the user activity data may indicate that the thumbnail 112B of the referee image was presented to User-A 102A, User-A 102A clicked on the thumbnail, marked the college basketball finals game video 108 as "like" at fifty seconds into the college basketball finals game video 108 at the segment when a basketball player shot the ball to score the winning point, and stopped consuming the college basketball finals game video 108 at fifty-seconds at the segment when the game was over. The college basketball finals game video 108 may have been three minutes and client device 104A may have stopped consuming the college basketball finals game video 108 at fifty-five seconds.

In another example, a web browser or mobile application can provide User-B 102B GUI 106B that may include a target video (e.g., college football game video 111) which User-B 102B may watching via client device 104B. The GUI 106B can also include a set of thumbnails for suggested videos 110B. One of the suggested videos may be the college basketball finals game video 108, which may be represented by thumbnail 112B. User-B 102B may not select thumbnail 112B. The user activity data of User-B 102B relating to the college basketball finals game video 108 can be collected and stored in one or more logs. For example, the user activity data may indicate that the thumbnail 112B using the referee image was presented to User-B 102B, but User-B 102B did not click on the thumbnail.

Implementations of the present disclosure may determine from user activity data, for example, that using the referee image as a thumbnail results in a low click rate for the college basketball finals game video 108. Implementations of the present disclosure may determine from user activity data that, for example, using an image of the player shooting the ball to win the game from the college basketball finals game video 108 as a thumbnail, instead of the referee image, may result in a higher click rate for the college basketball finals game video 108. For example, User-B may have clicked a thumbnail of the image of the player shooting the ball.

A click rate (also referred to as a click-through rate) for an online media item is a metric that can be defined as the number of user selections (e.g., clicks) on an online media item divided by the number of times the online media item is shown (impressions), expressed as a percentage. A consumption rate for an online media item is a metric that can be defined as the number of client devices consuming the online media item at any given point in time in the online media item divided by the number of client devices that started consuming the online media item, expressed as a percentage.

Figure 2:
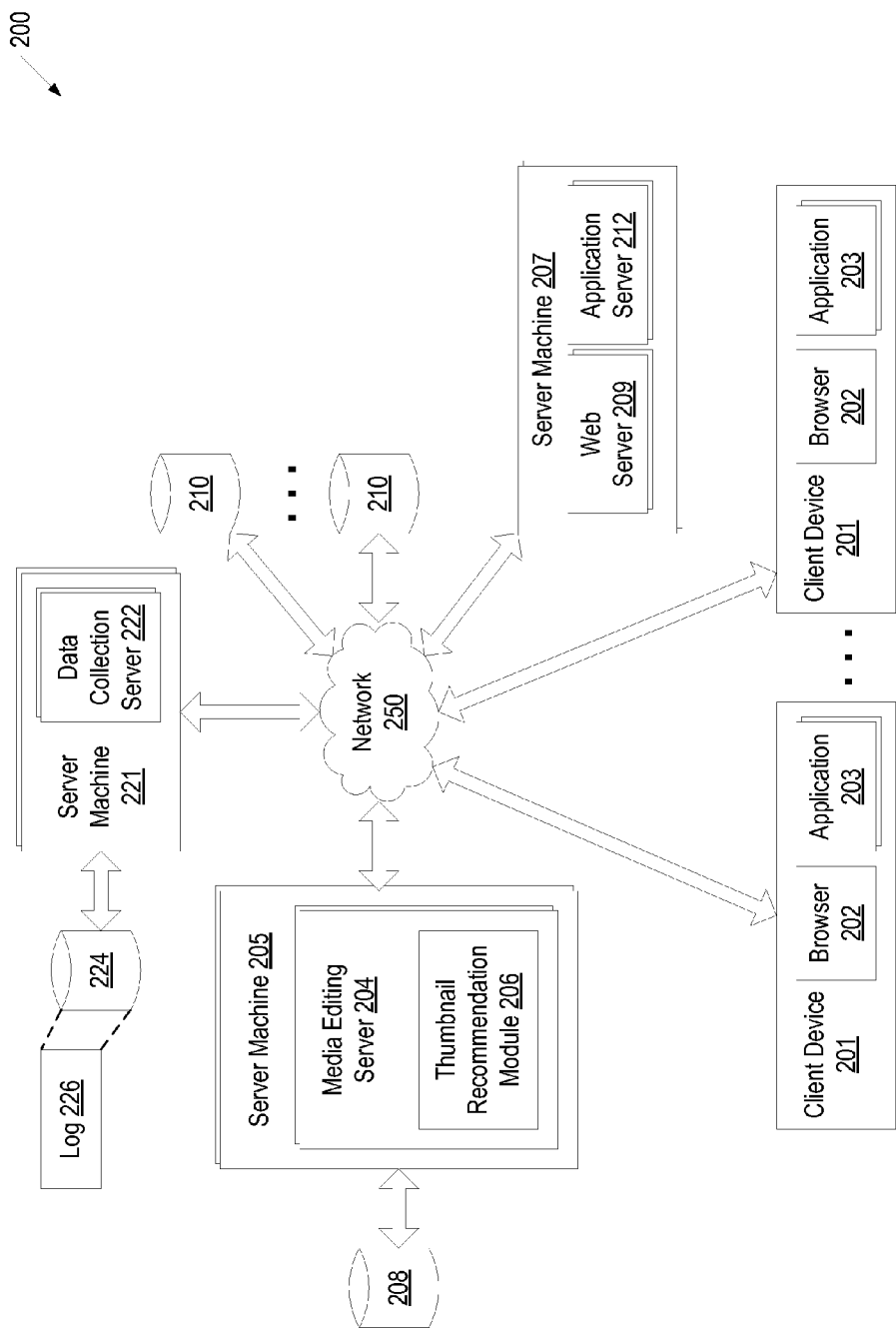
FIG. 2 illustrates example system architecture, in accordance with various implementations of the present disclosure.

FIG. 2 illustrates example system architecture 200 in which implementations can be implemented. The system architecture 200 can include any number of client devices 201, one or more server machines 205,207,221, and one or more data stores 210 coupled to each other over a network 250. Network 250 may be a public network (e.g., the Internet), a private network (e.g., a local area network (LAN) or wide area network (WAN)), or a combination thereof.

The data stores 210 can store online media items, such as, and not limited to, online digital video, online digital movies, online digital photos, online digital music, website content, social media updates, electronic books (ebooks), electronic magazines, digital newspapers, digital audio books, electronic journals, web blogs, real simple syndication (RSS) feeds, electronic comic books, software applications, etc. A data store 208,210,224 can be a persistent storage that is capable of storing data. As will be appreciated by those skilled in the art, in some implementations data store 208,210,224 might be a network-attached file server, while in other implementations data store 208,210,224 might be some other type of persistent storage such as an object-oriented database, a relational database, and so forth.

The client device 201 can be a portable computing device, such as, and not limited to, cellular telephones, personal digital assistants (PDAs), portable media players, netbooks, laptop computers, an electronic book reader or a tablet computer (e.g., that includes a book reader application), and the like. The client device 201 can also be other types of computing devices such as a desktop computer, a set-top box, a gaming console, a television, etc. that may not traditionally be considered to be portable.

The client devices 201 can run an operating system (OS) that manages hardware and software of the client devices 201. A browser 202 can run on the client devices 201 (e.g., on the OS of the client devices). The browser 202 can be a web browser that can access content served by a web server 209 hosted by the server machine 207. Alternatively, an application (e.g., mobile application 203) can run on the client devices 201 (e.g., on the OS of the client devices). The mobile application 203 can be an application that can access content served by an application server 212 hosted by the server machine 207.

The server machine 207 can host a web server 209 and/or application server 212 to provide web applications and/or mobile device applications and data for applications. Server machines 205,207, 221 can be a rack mount server, a router computer, a personal computer, a portable digital assistant, a mobile phone, a laptop computer, a tablet computer, a camera, a video camera, a netbook, a desktop computer, a media center, or any combination of the above.

One or more server machines 221 can include one or more data collection servers 222 to collect user activity data pertaining to the online media items stored in the data stores 210 and being served by the server machine 207. The data collection servers 222 can log the user activity data into one or more logs 226 in one or more data stores 224 that are coupled to the data collection servers 222. The collected data can include, for example, and is not limited to, direct linking data, pause data, replay data, like/dislike data, share data, recommend data, view data, purchase data, start time data, segment consumption data, user data, geography data, platform data, etc. One implementation of collecting the user activity data is described in greater detail below in conjunction with FIG. 3. In one implementation, the data collection servers 222 perform algorithms, execute models, etc. to calculate metrics and store the metrics in the logs. Examples of metrics can include, and are not limited to, click rate, consumption time, consumption rate, drop-off rate, etc.

Direct linking data can describe one or more points in time in the online media item that are being pointed to by other online media items. For example, Video-A can include a link to Video-B. The link can point to the 35 second point in time in Video-B. A user may be watching Video-A can may select the link, which can cause Video-B to start at the 35 second point. Pause data can describe one or more points in time in the online media item where the online media item is paused, for example, by a user. Replay data can describe one or more points in time in the online media item where the online media item is triggered to replay, for example, by a user. Like data can describe one or more points in time in the online media item where the online media item is marked as "like" or "dislike," for example, by a user. Add data can describe one or more points in time in the online media item where the online media item is added to a list (e.g., playlist, favorites, etc.), for example, by a user. Sharing data can describe one or more points in time in the online media item where the online media item is triggered to be shared to other users, for example, by a user. The online media item can be shared, for example, via email, social networks, mobile applications, etc. View data can describe the number of times the online media item is being viewed, for example, by users. Purchase data can describe one or more points in time in the online media item where the online media item triggers a purchase, for example, by a user. For example, the online media item may be of a rock band performing a song, and a user may click an annotation in the online media item to start a purchase process for purchasing the song that is performed.

The server machines 207,221 can request a user to optionally provide user information (e.g., country, etc.), receive the user information, and store the user information in the data store 224. In one implementation, a client device 201 notifies users of the types of information that are stored in the respective logs 226 and data stores 208,224 and transmitted to the servers 205,207,221 and provides the user the opportunity to choose not to have such information collected and/or shared with the servers 205,207,221.

The data collection servers 222 can also collect attribute data for the online media items and store the attribute data in the logs. Examples of attribute data can include, for example, and not limited to, an online media item identifier, a content owner identifier, a partner associated with the online media item, one or more languages associated with the online media item, and one or more keywords describing content of the online media item.

The server machine 205 can host a media editing server 204 to provide editing tools for editing online media items. The media editing server 204 can include a thumbnail recommendation module 206 to provide one or more recommendations of images that can be used as a thumbnail for an online media item based on user activity data associated with the online media item. The thumbnail recommendation module 206 can receive data from the logs 226, can extract data from the logs 226, and can store the extracted data in a data store 208 that is coupled to the thumbnail recommendation module 206. The thumbnail recommendation module 206 can determine various metrics for the online media items using the extracted data in the data store 208. One implementation for determining various metrics for the online media items using the extracted data is described in greater detail below in conjunction with FIG. 3. The thumbnail recommendation module 206 can send the recommended thumbnails to a client device 201. One implementation for sending the recommendations to a user via client device is described in greater detail below in conjunction with FIG. 4.

Figure 3:
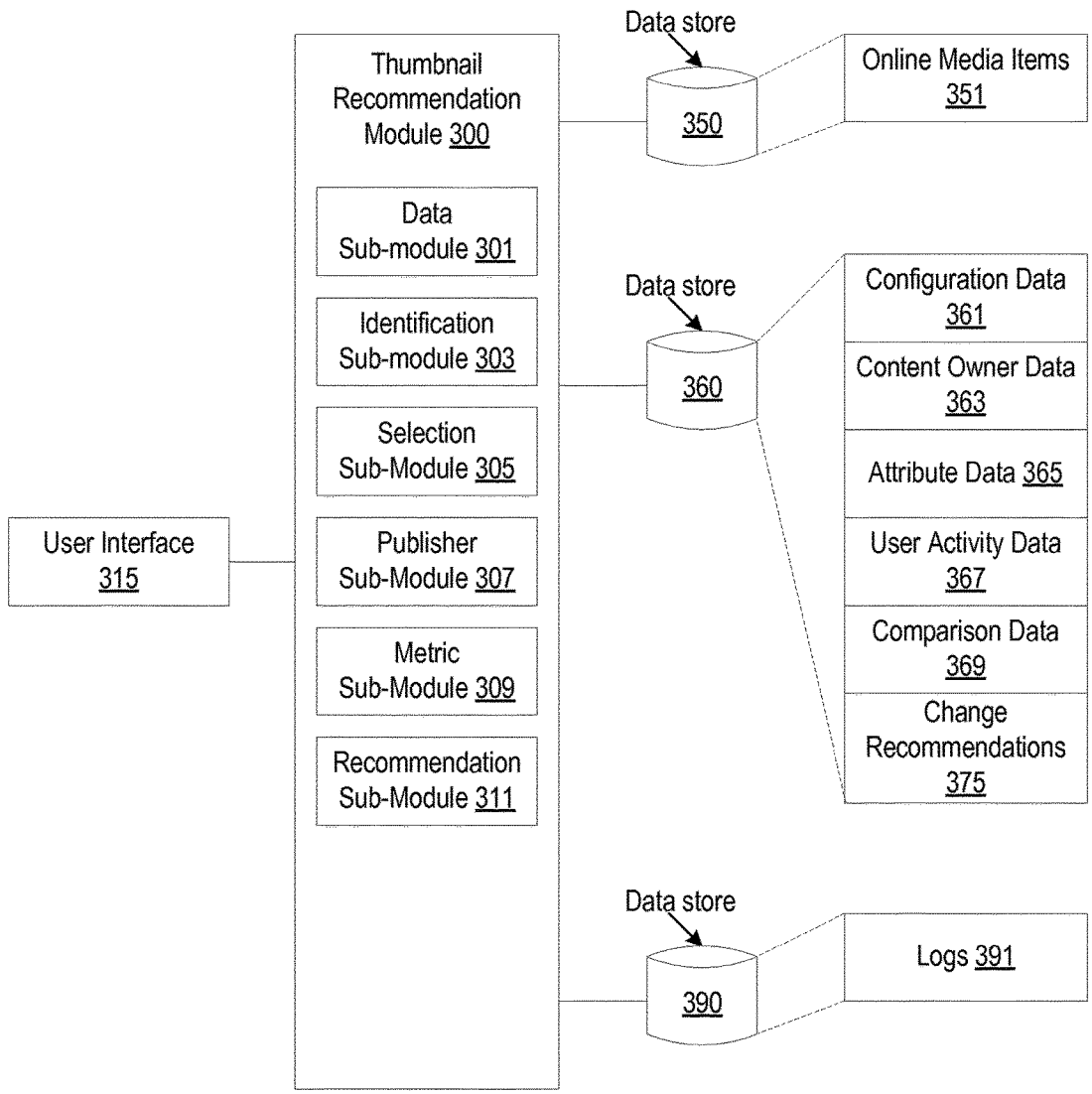
FIG. 3 is a block diagram of a thumbnail recommendation module, in accordance with various implementations.

FIG. 3 is a block diagram of a thumbnail recommendation module 300, in accordance with one implementation of the present disclosure. The thumbnail recommendation module 300 can include a data sub-module 301, an identification sub-module 303, a selection sub-module 305, a publisher sub-module 307, a metric sub-module 309, and a recommendation sub-module 311. Note that in alternative implementations, the functionality of one or more of the sub-modules may be combined or divided.

The thumbnail recommendation module 300 can be coupled to one or more data stores 350 that store online media items 351. A data store 350,360,390 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The data sub-module 301 can be coupled to one or more data stores 390 that store logs 391. The logs 391 can include user activity data, content owner data, and media item attribute data pertaining to the online media items 351. The user activity data can be for any number of users. The content owner data can be for any number of content owners. The media item attribute data can be for any number of media items. The data sub-module 301 can search the logs 391, extract data from the logs 391, and store the data in a data store 360 that is coupled to the data sub-module 301. The data sub-module 301 can use the configuration data 361 to determine which terms to search for in the logs 391. The configuration data 361 can be stored in the data store 360. The configuration data 361 can be user defined. For example, a system administrator may define the configuration data 361 via a user interface 315 that is coupled to the thumbnail recommendation module 300. The user interface 315 can be a graphical user interface (GUI).

The data sub-module 301 can extract and store content owner data 363 in the data store 360. Examples of content owner data 363 can include, and are not limited to, a content owner identifier, media item identifiers of the content owner, a reputation score for the content owner, etc. The reputation score can be based on history data that indicates a history of the content owner using an image for a thumbnail which may result in a video having a low click rate, a low click rate with high consumption rate, a high click rate, a high click rate with low consumption rate, high click rate with high consumption rate, etc.

A click rate click-through rate) for an online media item is a metric defined as the number of user selections (e.g., clicks) on an online media item divided by the number of times the online media item is shown (impressions), expressed as a percentage. Consumption time is the time one or more client devices spend consuming an online media item.

A consumption rate for an online media item is a metric defined as the number of client devices consuming the online media item at any given point in time in the online media item divided by the number of client devices that started consuming the online media item, expressed as a percentage. For example, one hundred client devices started consuming Video-A. At ten seconds into Video-A, seventy of the client devices are still consuming Video-A. At twenty seconds forty of the client device are still consuming Video-A. Video-A has a 70% consumption rate at ten seconds and a 40% consumption rate at twenty seconds.

A drop-off rate is a metric indicating a number of client devices that were consuming the online media item and are no longer consuming the online media between points in time. For example, one hundred client devices are consuming Video-A starting at time zero. At ten seconds seventy of the client device are still consuming Video-A. Video-A has a 30% drop-off rate at from zero seconds to ten seconds.

The data sub-module 301 can extract and store media item attribute data 365 in the data store 360. Examples of attribute data 365 can include, for example, and not limited to, an online media item identifier, a content owner identifier, a partner associated with the online media item, one or more languages associated with the online media item, one or more keywords describing content of the online media item, length of the online media item, upload date, upload time, data source (e.g, show, season, episode, clip, etc.) etc. The data sub-module 301 can determine frame data for the online media items and store the frame data as part of the attribute data 365. The data sub-module 301 can include perform a color analysis for the frames of the online media item and store color information in the frame data.

The data sub-module 301 can extract and store user activity data 367 in the data store 360. Examples of user activity data 367 can include, and are not limited to, the identifier of the online media item, a start time of consumption, a stop time for consumption, the consumption time, a content owner identifier, a geography (e.g., country, city, state, etc.) identifier associated with consumption of the online media item, a click rate, a watch rate from clicking the thumbnail, a watch rate from viewing a thumbnail, direct linking data, pause data, replay data, like/dislike data, share data, recommend data, content change data, view data, purchase data, a device platform identifier associated with consumption of the online media item, an operating system identifier associated with consumption of the online media item, etc.

The data sub-module 301 can receive the logs 391, extract data, store the extracted and/or update stored data (e.g., content owner data 363, attribute data 365, user activity data 367) periodically based on a period in the configuration data 361. For example, the data sub-module 301 may receive and process the logs 391 once a day. In one implementation, the data sub-module 301 stores the data (e.g., content owner data 363, attribute data 365, user activity data 367) in one or more databases.

In another example, a thumbnail recommendation analysis may be performed on an online media item after the online media item is published for other users to consume (e.g., watch) and user activity data (e.g., click rate, consumption rate, drop-off rate, likes/dislikes, adds to a playlist, shares, purchases, recommends, etc.) is collected and/or calculated for the online media item. The identification sub-module 301 can identify an online media item that has already been uploaded, published, and user activity data has already been collected and/or determined for the online media item.

The selection sub-module 303 can select which of the online media items that have been identified by the identification sub-module 301 are to be analyzed for a thumbnail recommendation. The data stores 350 can store any number of online media items. In one implementation, a subset of the online media items is selected for a thumbnail recommendation analysis.

The selection sub-module 303 can use one or more criteria for selecting an online media item for a thumbnail recommendation analysis. The criteria can be specified in the configuration data 361. For example, the configuration data 363 may specify that the selection sub-module 303 determine whether a reputation score of the content owner of the online media item satisfies a threshold. In another example, the selection sub-module 303 determines whether a current thumbnail for a video does or does not have any similar frames from the video. In another example, the configuration data 363 may specify that the selection sub-module 303 compare the consumption rate at a point in time (e.g., ten seconds) for the online media item to an average consumption rate at the same point in time for similar online media items.

In one implementation, the selection sub-module 303 determines which online media items to analyze based on a reputation score of the content owner of the online media item in the content owner data 363. The reputation score can indicate a history of the content owner using an image for a thumbnail which may result in a video having a low click rate, a low click rate with high consumption rate, a high click rate, a high click rate with low consumption rate, high click rate with high consumption rate, etc.

The selection sub-module 303 can use a reputation score threshold that is stored in configuration data 363 in the data store 360. The selection sub-module 303 can locate the reputation score that corresponds to the content owner identifier that is associated with an identified online media item and can compare the content owner reputation score to the reputation score threshold to determine whether the online media item should be analyzed for a thumbnail recommendation.

The publisher sub-module 307 can publish online media items to allow client devices to consume the online media items. The publisher sub-module 307 can publish an online media item without restrictions. For example, the publisher sub-module 307 can publish the online media item to allow any user to consume the online media item. The publisher sub-module 307 can publish the online media items using publishing parameters in the configuration data 361. Examples of publishing parameters can include, and are not limited to, which image to use for a default thumbnail, a number of users that can consume the online media item, a number of sets of users, alternate images to use for the thumbnail, which thumbnail to use for which set of users, etc.

For example, the publishing parameters may specify that the image from the start of the video should be used as the default thumbnail, and that an image from a segment of the video that has a high consumption rate should be used as the image for an alternate thumbnail. The publishing parameters may further specify that the video should be published to 500 users and that 95% of the 500 users should receive the online media item using the default image for the thumbnail, and that 5% of the 500 users should receive the online media item using the alternate image for the thumbnail. A thumbnail can be include multiple images. For example, the publishing parameters may specify that an image that is made up of a digital image of a referee, a digital image of the game winning shot, and a digital image of the celebration afterwards should be used as the default thumbnail. The publishing parameters may specify that an alternate thumbnail be made up of a digital image of a referee, a digital image of referee calling a foul, and a digital image of the scoreboard.

The publisher sub-module 307 can adjust the publishing parameters. For example, the publisher sub-module 307 can publish the online media item where 60% of the 500 users receive the online media item using the default image for the thumbnail and 40% of the 500 users receive the online media item using the alternate image for the thumbnail.

The metric sub-module 309 can determine how the online media item ranks compared to other online media items using the content owner data 363, attribute data 365, and/or user activity data 367. The metric sub-module 309 can identify which comparison factors to use from the configuration data 361. The metric sub-module 309 can select the other online media items by, for example, and not limited to, content owner, topic, source, geography, language, etc. Examples of a source can include, and are not limited to, show, season, episode, clip, etc. For example, the configuration data 361 may specify that the metric sub-module 309 should compare click rate from thumbnail view for the online media item to the click rate from thumbnail view for other online media items that have the same topic. The metric sub-module 309 can store the rankings as comparison data 369 in the data store 360.

The comparison data 369 can include data describing how the user activity data for the online media item compares to the user activity data for the other online media items. For example, the comparison data 369 may indicate that users in Country-ABC tend to complete watching a soccer video that is similar to a soccer video undergoing a thumbnail recommendation analysis when an image of a star soccer player, Player-123, from Country-ABC is used as the thumbnail.

The recommendation sub-module 311 can determine whether to recommend an image for the thumbnail for an online media item. The recommendation sub-module 311 can make the determination based on the rankings determined by the metric sub-module 309. The recommendation sub-module 311 may select the lowest ranking online media items first for identifying an image for a thumbnail. The configuration data 361 can store ranking parameters which the recommendation sub-module 311 can use. For example, the ranking parameters may specify that the recommendation sub-module 311 should identify one or more images to recommend for a thumbnail if an online media item is a low ranking video and has a high click rate. Examples of ranking parameters can include, and are not limited to, a threshold for a drop-off rate early in the video, a threshold for a drop-off rate at any point in the video, a threshold for performance differences by source, etc. The recommendation sub-module 311 can add online media items to a queue for identifying an image to recommend for a thumbnail.

The recommendation sub-module 311 can use segment parameters in the configuration data 361 to fragment the online media item into segments. For example, the configuration data 361 may specify that the recommendation sub-module 311 should create segments that are ten seconds in length in the online media item. The segments can be over-lapping segments. The recommendation sub-module 311 can map the data (e.g., attribute data 365, user activity data 367) for the online media item to the segments. For example, the first segments in the online media item may have a high consumption rate. In another example, the $5^{th}$ segment in the online media item may indicate that users "like" the online media item during the $5^{th}$ segment.

The recommendation sub-module 311 can extract features from the segments, such as, and not limited to, the amount of human speech, whether there is any proprietary content, whether there is recognizable content (e.g., recognizable person), the dimensions per second and frames per second, etc., and stores the feature data as part of the attribute data 365. In one implementation, the recommendation sub-module 311 uses a binary classifier to tag the segments as either retain or remove and stores the tag data as part of the attribute data 365. In one implementation, processing logic receives the features from another system.

The recommendation sub-module 311 can use one or more criteria that are in the configuration data 361 to determine the type of recommendation to make. For example, the configuration data 361 may specify that the recommendation sub-module 311 should identify an image to recommend for use as a thumbnail based on consumption rate. Examples of criteria can include, and are not limited to, consumption rate, drop-off rate, purchase data, like/dislike data, share data, add data, recommend data, linking data, etc. The recommendation sub-module 311 can identify one or more images from one or more segments that meet the one or more criteria and can store the image recommendation(s) in the data store as thumbnail recommendations 375. The recommendation sub-module 311 can use the comparison data 369 to personalize the image recommendation, for example, by geography, language, topic, etc. One implementation of personalizing the image recommendation is described in greater detail below in conjunction with FIG. 9.

The recommendation sub-module 311 can recommend the one or more images for the thumbnail, for example, by sending a notification to a user via a client device, by automatically configuring the thumbnail using a recommended image, etc. One implementation of recommending the images for the thumbnail is described in greater detail below in conjunction with FIG. 4.

Figure 4:
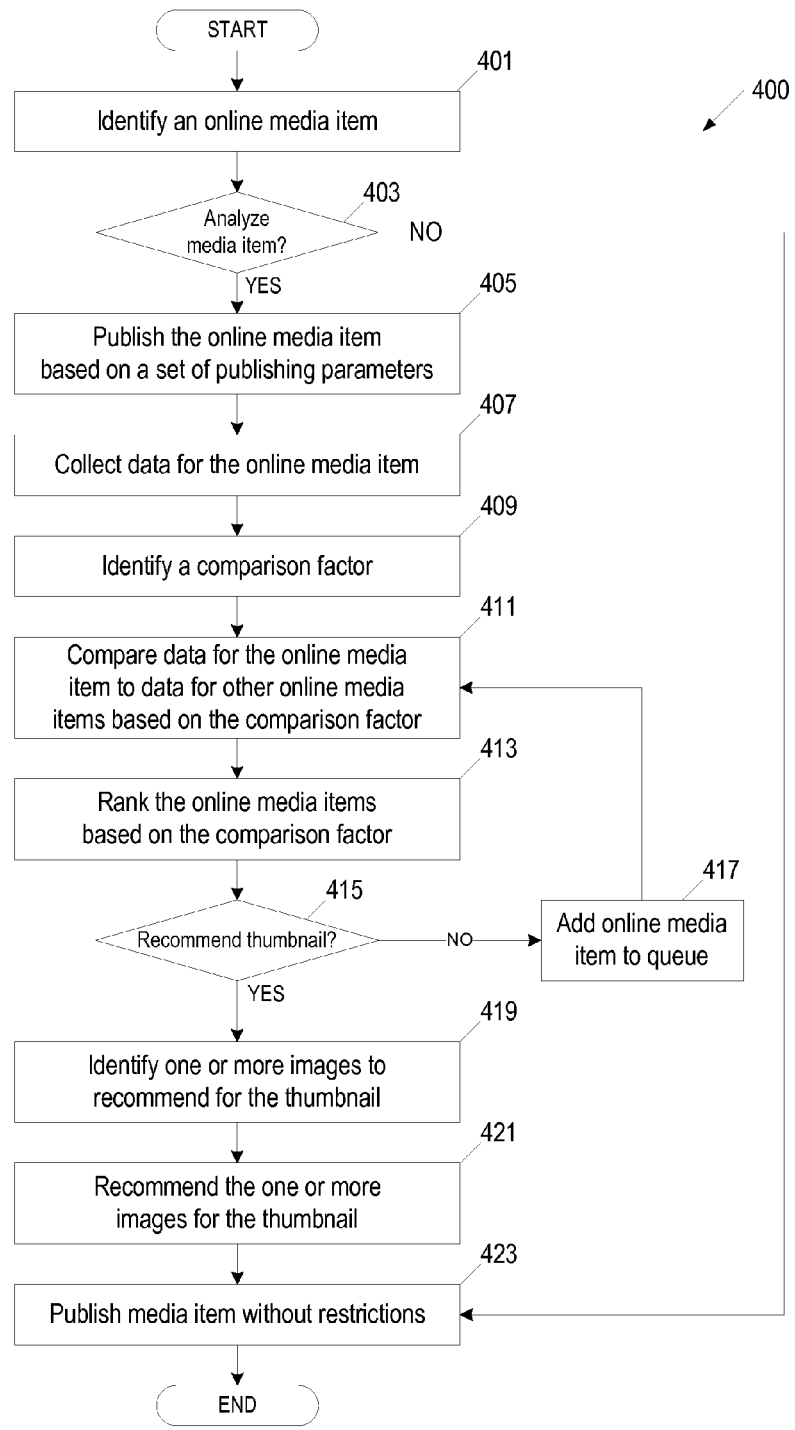
FIG. 4 is a flow diagram of an implementation of a method for recommending a thumbnail for an online media item based on user activity data.
Figure 9:
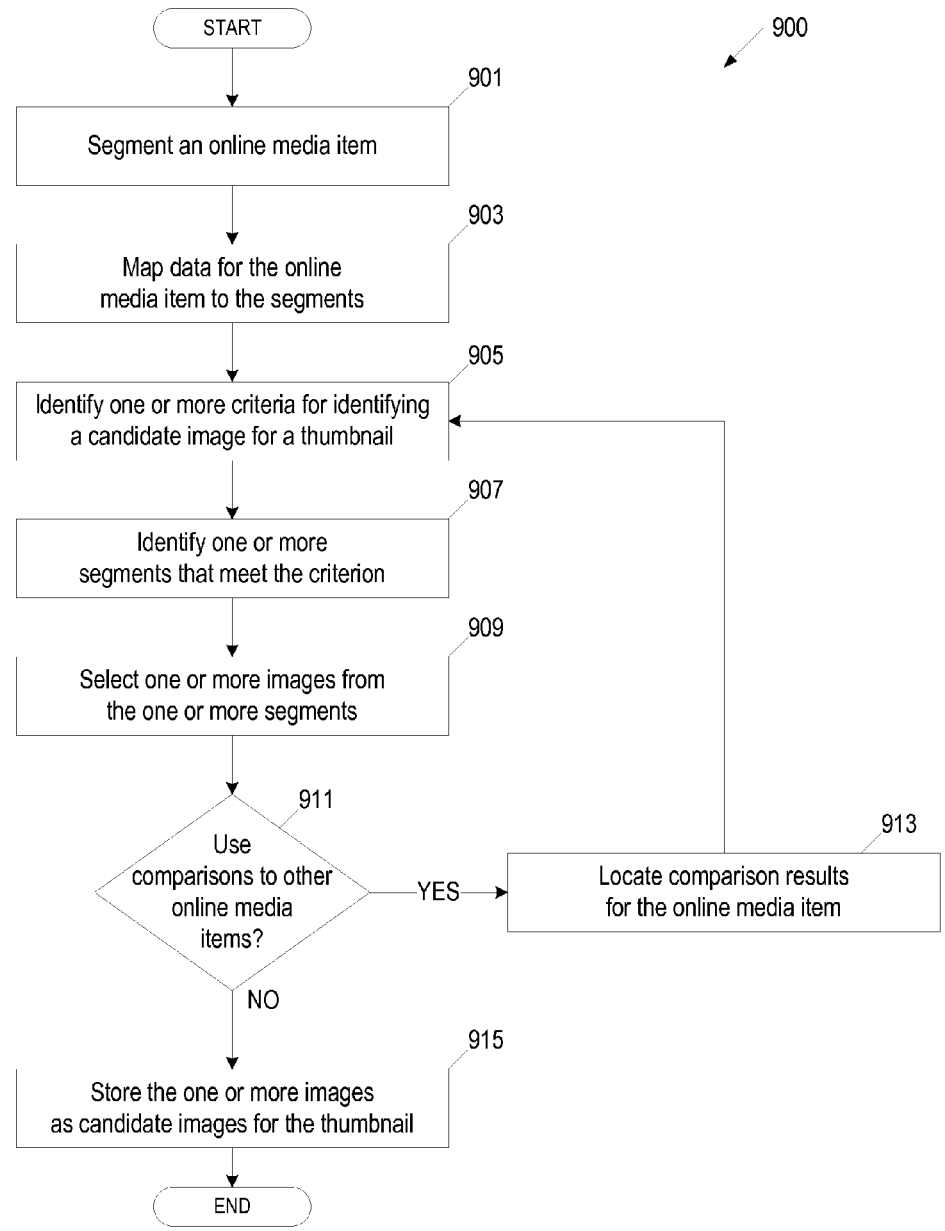
FIG. 9 is a flow diagram of an implementation of a method for identifying images to recommend as thumbnails for an online media item.

FIG. 4 is flow diagram of an implementation of a method for recommending a thumbnail for an online media item based on user activity data. FIG. 9 is flow diagram of an implementation of a method for identifying images to recommend as thumbnails for an online media item. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is flow diagram of an implementation of a method 400 for recommending a thumbnail for an online media item based on user activity data. The method 400 may be performed by processing logic that may comprise hardware (circuitry, dedicated logic, etc.), software (such as is run on a general purpose computer system or a dedicated machine), or a combination of both. In one implementation, the method 400 may be performed by the thumbnail recommendation module 206 hosted by server machine 205 of FIG. 2.

At block 401, processing logic identifies an online media item. For example, processing logic may detect an online media item that has been uploaded to a server for a first time. In another example, processing logic can identify an online media item that has been previously uploaded, published to users, and has user activity data collected for the online media item. An identified online media item can be a candidate for a thumbnail recommendation analysis.

At block 403, processing logic determines whether to analyze the online media item. There may be any number of users that upload any number of online media items. Processing logic can use one or more criteria to determine which of the online media items to analyze for a thumbnail recommendation. For example, processing logic can identify a reputation score that is associated with the content owner of the online media item and can determine whether the reputation score of the content owner satisfies a threshold. If the content owner has a reputation of using images for thumbnails that do not accurately represent the content of the online media item, processing logic may select the online media item for analysis. In another example, processing logic can use the color in the frames of the online media item to flag the thumbnail of the online media item if the thumbnail does not have any similar frames in the online media item. Processing logic can compare the color of thumbnails from one frame to the color in the frames that are near the frame associated with the thumbnail. Processing logic may select the online media item having the flagged thumbnail for analysis. In another example, processing logic can compare the consumption rate at a point in time (e.g., ten seconds) for the online media item to an average consumption rate at the same point in time for similar online media items. If the consumption rate of the online media item is below average, processing logic may select the online media item for analysis.

If the online media item is not to be analyzed (block 403), processing logic publishes the online media item without restrictions at block 423. For example, process logic may publish the online media item to any number of users. If the online media item is to be analyzed (block 403), processing logic publishes the online media item based on a set of publishing parameters at block 405. For example, for testing purposes, processing logic may publish the online media item to a limited set of users and with a default image as the thumbnail. The number of users in the limited set of users can be a configurable number. Processing logic can determine the number of users, groups of users, number of thumbnails to use, images to use for the thumbnails, etc., from configuration data that is stored in the data store. For example, the configuration data may specify that the online media item be published to five hundred users. The configuration data may also specify, for example, for testing purposes, that the online media item should use Image-A as Thumbnail-A and should be sent to 90% of the limited set of users, and that the online media item should use Image-B as Thumbnail-B and should be sent to 10% of the limited set of users. Image-A can be made up of one or more digital images and Image-B can be made up of one or more digital images. For example, Image-A may be made up of a digital image of a referee, a digital image of the game winning shot, and a digital image of the celebration afterwards. Image-B may be made up of a digital image of a referee, a digital image of referee calling a foul, and a digital image of the scoreboard. Image-A may be expected to be more interesting and relevant to users. Processing logic can compare the user activity data of the online media item using Image-A to the user activity data for the online media item using Image-B, measure the differences, and store the results.

At block 407, processing logic collects data (e.g., content owner data, attribute data, user activity data, etc.) for the online media item. Processing logic can receive logs from one or more data collection servers, extract data from the logs, and store the extracted data in one or more data stores that are coupled to the thumbnail recommendation module. Examples of data that can be extracted from the logs can include, and are not limited to, click rate of the thumbnail for the online media item, consumption rate, direct linking data, pause data, replay data, like/dislike data, add data, sharing data, view data, purchase data, etc. In one implementation, the consumption rate is based from when a user clicks, for example, a thumbnail, to start consuming (e.g., watching) the online media item. The consumption rate can describe the percentages of the limited set of users that are consuming the online media item at any given point of time and/or any window of time in the online media item. The consumption rate can be determined using short windows of time. An online media item may have a high consumption rate for one or more short windows of time. In another implementation, the consumption rate is based from when a thumbnail is presented to a user. For example, the consumption rate can be determined from the when the thumbnail of the online media item is presented in a browser and/or mobile application as a suggested online media item.

At block 409, processing logic identifies a comparison factor to use based on configuration data that is stored in the data store and compares the data for the online media item to the data for other online media items based on the comparison factor at block 411. Examples of comparison factors can include, and are not limited to, content owner, topic, source, geography, language, etc. Examples of a source can include, and are not limited to, show, season, episode, clip, etc. Processing logic can identify similar online media items to use for the comparison based on the comparison factors from the configuration data. For example, processing logic may compare the click rate from thumbnail view for the online media item to the click rate from thumbnail view for other online media items that have the same topic.

At block 413, processing logic ranks the online media items based on the comparison. For example, the online media item may be ranked as having the lowest click rate from thumbnail view compared to the other online media items. In another example, processing logic may rank the online media items by a drop-off rate that is measured early in the online media items. In another example, processing logic may rank the online media items by drop-off rates that are measured at various points in time in the online media items. In one implementation, processing logic averages the comparison factor (e.g., click rate from thumbnail view) of the other online media items and determines whether the online media item that is undergoing the thumbnail recommendation analysis is below the average. For example, processing logic determines an average consumption rate at a point in time (e.g., ten seconds) for other online media items that have a similar topic as the online media item and compares the consumption rate at the point in time (e.g., ten seconds) for the online media item to the average. Process logic can store the ranking data in the data store.

At block 415, processing logic determines whether to recommend a thumbnail for the online media item based on the comparison results. Processing logic can prioritize which online media items to recommend thumbnail images for. The comparison results can indicate if the online media item is underperforming relative to other online media items. For example, processing logic may select the lowest ranking online media items first for identifying an image for a thumbnail. The configuration data can store ranking parameters which processing logic can use to make the determination. For example, the ranking parameters may specify that processing logic should identify one or more images for thumbnails if the online media item is a low ranking video and has a high click rate. Examples of ranking parameters can include, and are not limited to, a threshold for a drop-off rate early in the video, a threshold for a drop-off rate at any point in the video, a threshold for performance differences by source, etc.

If a thumbnail should not be recommended (block 415), processing logic can add the online media item to a queue at block 417 and processing logic can return to block 411 to compare the data for the online media item to other online media items to determine if the rankings are changed at block 413. For example, the online media item may be performing above average in consumption rate and processing logic can place the online media item in the queue and focus on online media items that are underperforming.

If a thumbnail should be recommended (block 415), processing logic identifies one or more images to recommend for use for a thumbnail for the online media item at block 419. Processing logic can make various types of recommendations. Processing logic can make a recommendation based on the data of the online media item and may make a recommendation based on the comparison of the data of the online media item to the data of other online media items. One implementation of identifying one or more images to recommend as a thumbnail is described in greater detail below in conjunction with FIG. 9. Processing logic can store the image recommendations in the data store.

At block 421, processing logic recommends the one or more images for the thumbnail. In one implementation, processing logic sends a notification indicating the recommended image(s) for the thumbnail to a user via a client device. The message can be, and is not limited to, an email message, a text message, an instant message, a social networking message, a visual alert, a message in an application, and/or a sound alert. In one implementation, processing logic sends notification data to a client device via a user interface (e.g., user interface 315 in FIG. 3). The user interface can be a graphical user interface (GUI). The recommendation data can include, for example, and is not limited to, comparisons of user activity data for the online media to user activity data for other online media items, comparisons based on user activity data for experiments using various images as thumbnails, etc. The recommendation data can be sent to client devices using one or more visual representations via a graphical user interface. Various implementations of sending recommendation data to a user via a client device are described in greater detail below in conjunction with FIGS. 6-8.

In another implementation, processing logic automatically edits the online media item with one of the suggested images as the thumbnail for the online media item. In one implementation, a recommendation can include data describing which segments of the online media should not be used for a thumbnail. For example, the last segments of the online media item may include the ending of a show and an image from one of the last segments should not be used for the thumbnail.

At block 423, processing logic publishes the online media item without restrictions. For example, processing logic may not limit the number of users that have access to consume the online media item.

Figure 5:
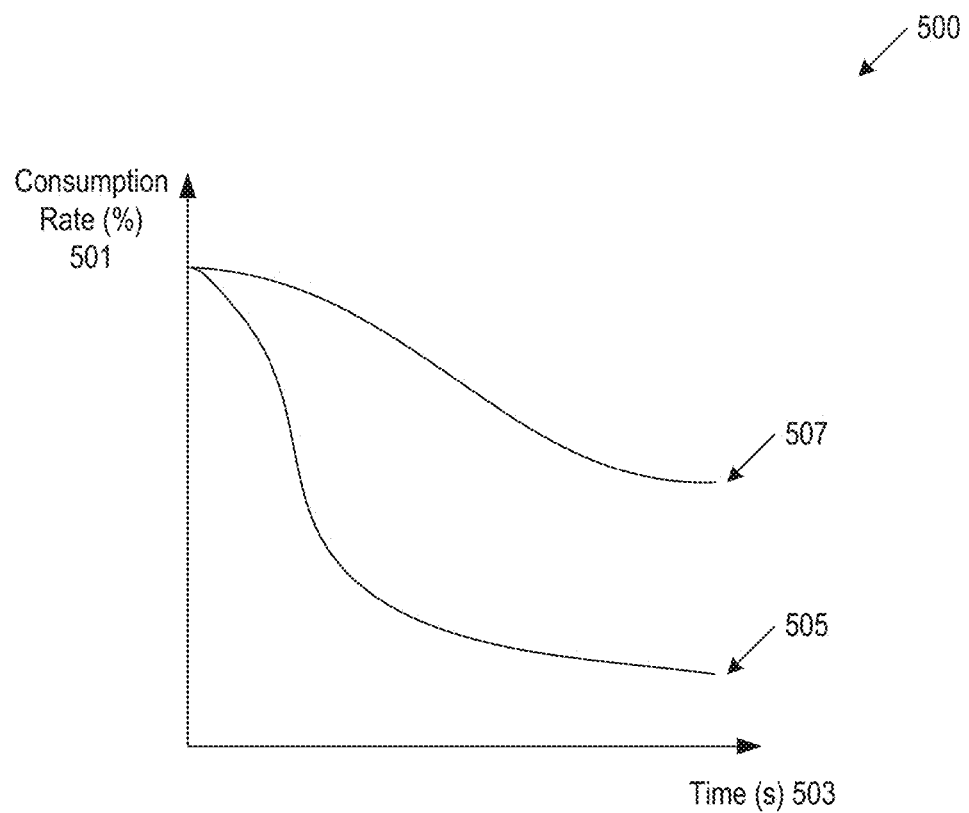
FIG. 5 illustrates an example visual representation describing performance of the online media item, according to various implementations.

FIG. 5 illustrates an example visual representation 500 describing performance of the consumption rate of an online media item at various points in time in the online media item compared to an average computed for other similar online media items, according to various implementations. The visual representation 500 can be an x-y graph, where the y-axis 501 can represent consumption rate percentages and the x-axis 503 can represent time, for example, in seconds. The graph can include a line curve 505 to represent the data for the online media item and a line curve 507 to represent the data for other similar online media items. The line curve 505 to represent the data for the online media item indicates that the online media item has a consumption rate that is lower than the average computed for other similar online media items. The online media item may be selected for a thumbnail recommendation analysis based on the data in graph. The visual representation 500 can be sent to a client device via a graphical user interface (e.g., a web page rendered via a browser, a mobile application GUI, etc.).

Figure 6:
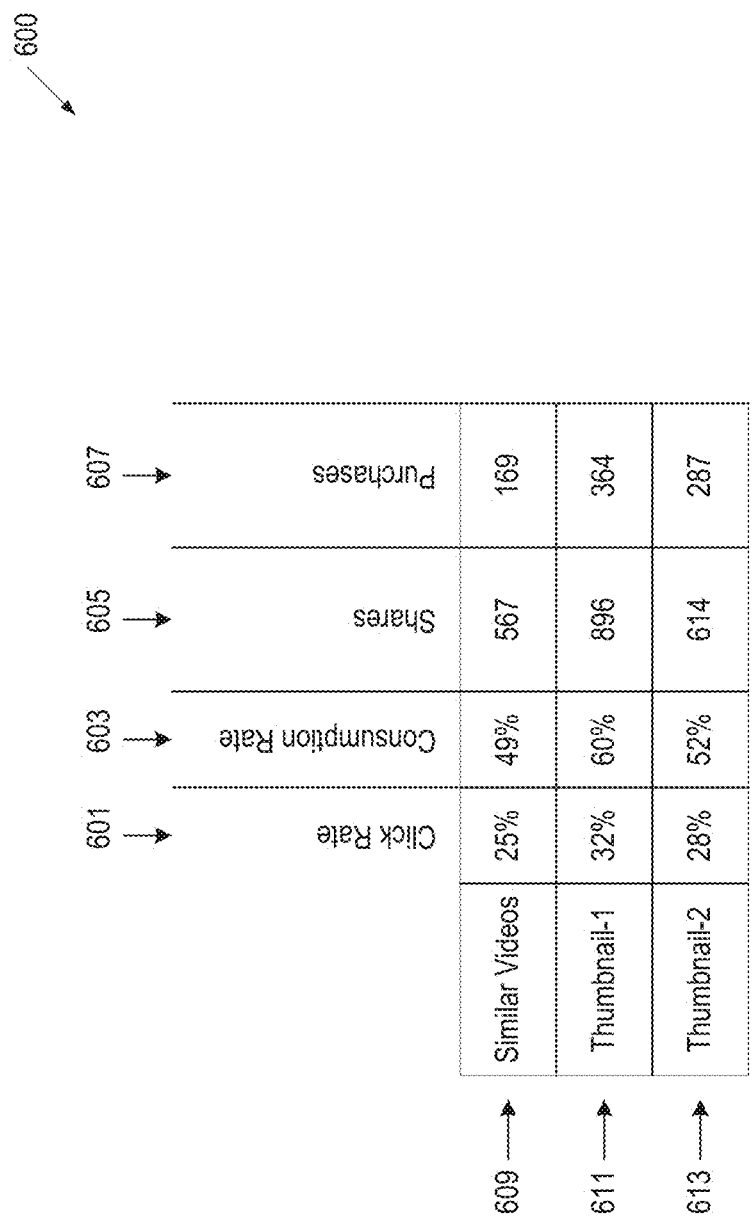
FIG. 6 illustrates an example table describing performance of various thumbnails for an online media item, according to various implementations.

FIG. 6 illustrates an example table 600 describing performance of various thumbnails compared to an average computed for other similar online media items, according to various implementations. Table 600 can be sent to a client device via a graphical user interface (e.g., a web page rendered via a browser, a mobile application GUI, etc.). Table 600 can include percentages for click rate 601, consumption rate 603, shares 605, and purchases 607. The percentages can be determined from user activity data collected for various thumbnails 611,613, and from user activity data that is collected for other online media items 609 that are similar. The table 600 can include an average 609 for the similar online media items 609. The table 600 indicates that Thumnail-1 611 has a higher click rate 601 (e.g., 32%) than Thumbnail-2 613 and the similar online media items 609. The table 600 indicates that Thumnail-1 611 has a higher consumption rate 603 (e.g., 60%) than Thumbnail-2 613 and the similar online media items 609. The recommendation may be to use Thumbnail-1 611 based on the data in table 600.

Figure 7:
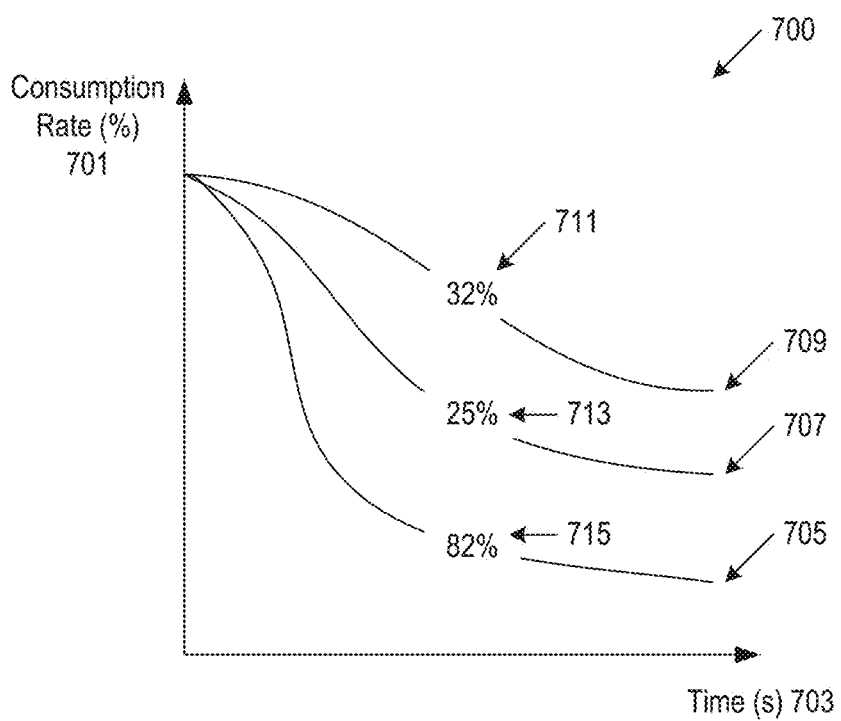
FIG. 7 illustrates an example visual representation describing performance of the various thumbnail images for an online media item, according to various implementations.

FIG. 7 illustrates an example visual representation 700 describing performance of the consumption rate of using various thumbnail images for an online media item at various points in time in the online media item compared to other similar online media items, according to various implementations. The visual representation 700 can be sent to a client device via a graphical user interface (e.g., a web page rendered via a browser, a mobile application GUI, etc.). The visual representation 700 can be an x-y graph, where the y-axis 701 can represent consumption rate percentages and the x-axis 703 can represent time, for example, in seconds. The graph can include a line curve 705 to represent the data for the online media item using Thumbnail-1, a line curve 709 to represent the data for the online media item using Thumbnail-2, and a line curve 707 to represent the data for other similar online media items. The graph can also include data describe the click rate 715,711,713 that corresponds to the Thumbnail-1, Thumbnail-2, and other similar online media items. The recommendation may be to change versions of the online media item using Thumbnail-1 to use Thumbnail-2 based on the data in graph even though the click rate 711 for Thumbnail-2 is lower than the click rate 715 for Thumbnail-1 because Thumbnail-2 results in a much higher consumption rate, as indicated in line curve 709, than Thumbnail-1.

Figure 8:
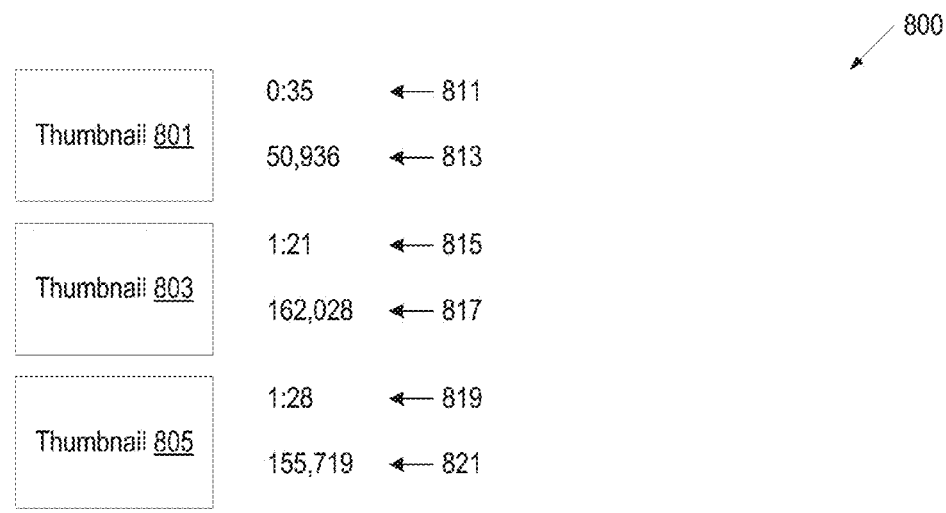
FIG. 8 illustrates an example visual representation describing performance of an online media item using various thumbnail images, according to various implementations.
Figure 8:
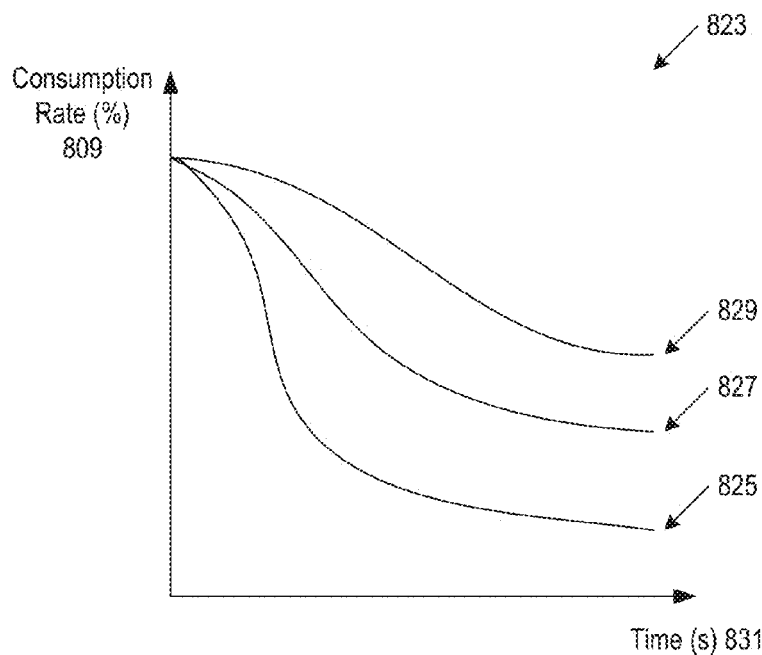

FIG. 8 illustrates an example visual representation 800 describing performance of an online media item using various thumbnail images and compared to other similar online media items, according to various implementations. The visual representation 800 can be sent to a client device via a graphical user interface (e.g., a web page rendered via a browser, a mobile application GUI, etc.). The visual representation 800 can include an x-y graph 823 and images 801,803,805 of the various thumbnails. The y-axis 809 in the graph 823 can represent consumption rate percentages and the x-axis 831 can represent time, for example, in seconds. The graph can include a line curve 829 to represent the data for the online media item using Thumbnail-1 (e.g., image for thumbnail 803), a line curve 827 to represent the data for the online media item using Thumbnail-2 (e.g., image for thumbnail 805), and a line curve 825 to represent the data for other similar online media items.

The visual representation 800 can also include the point in time 811 in the online media item that corresponds to the image 801 used for other similar online media items, the point in time 815 in the online media item that corresponds to the image 803 used for Thumbnail-1 for the online media item, and the point in time 819 in the online media item that corresponds to the image 805 used for Thumbnail-2 for the online media item. The visual representation 800 can also include the number 813 of users and/or client devices that consumed the entire length of the similar online media items, the number 817 of users and/or client devices that consumed the entire length of the online media item using Thumbnail-1, and the number 821 of users and/or client devices that consumed the entire length of the online media item using Thumbnail-2. The visual representation 800 indicates that more users and/or client devices consumed the online media item using Thumbnail-1 803 compared to the online media item using Thumbnail-2 805. The visual representation 800 also indicates that the online media item using Thumbnail-1 has a higher consumptions rate, as indicated by line curve 829, than the online media item using Thumbnail-2, for example, as indicated by line curve 825. The recommendation may be to change versions of the online media item using Thumbnail-2 to use Thumbnail-1 based on the data in visual representation 800.

FIG. 9 is flow diagram of an implementation of a method 900 for identifying one or more images to recommend as thumbnails for an online media item. The method 900 may be performed by processing logic that may comprise hardware (circuitry, dedicated logic, etc.), software (such as is run on a general purpose computer system or a dedicated machine), or a combination of both. In one implementation, the method 900 may be performed by the thumbnail recommendation module 206 hosted by server machine 205 of FIG. 2.

At block 901, processing logic segments an online media item. Processing logic can use segment parameters defined in configuration data that is stored in a data store that is coupled to the thumbnail recommendation module to fragment the online media item into segments. For example, the configuration data may specify that processing logic should create segments that are ten seconds in length in the online media item. The segments can be over-lapping segments.

At block 903, processing logic maps the data (e.g., attribute data, user activity data) for the online media item to the segments. For example, the first few segments in the online media item may have a high consumption rate. In another example, the $5^{th}$ segment in the online media item may indicate that users mark the online media item as "like" during the $5^{th}$ segment. Processing logic can also extract features from the segments, such as, and not limited to, the amount of human speech, whether there is any proprietary content, whether there is recognizable content (e.g., recognizable person), the dimensions per second and frames per second, etc., and stores the feature data in the data store. In one implementation, processing logic uses a binary classifier to tag the segments as either retain or remove and stores the tag data in the data store. In one implementation, processing logic receives the features from another system.

At block 905, processing logic identifies one or more criteria for identifying a candidate image for a thumbnail. Processing logic can use one or more criteria that are in the configuration data to determine the type of recommendation to make. For example, the configuration data may specify that processing logic should identify an image to recommend for use as a thumbnail based on consumption rate. Examples of criteria can include, and is not limited to, consumption rate, drop-off rate, purchase data, like/dislike data, share data, add data, recommend data, linking data, etc.

At block 907, processing logic identifies one or more segments that meet the one or more criteria and selects one or more images for the one or more segments to recommend for the thumbnail at block 909. Processing logic can store the image recommendation(s) in the data store as thumbnail recommendations. For example, processing logic may identify the criterion is high consumption rate. Processing logic may determine that a college basketball final game video has a high consumption rate at the segments that include a basketball player shooting a three-point jump shot to win the game. Processing logic may select an image of the basketball player from one of the segments that have a high consumption rate.

At block 911, processing logic determines whether to use the comparisons to the other online media items for identifying an image to recommend for the thumbnail. Processing logic can make the determination based on user input received, for example, from a content owner, from the configuration data, etc. Processing logic can use the comparison data to personalize the image recommendation, for example, by geography, language, topic, etc.

If the comparisons to the other online media items should not be used (block 911), processing logic stores the one or more images (e.g., basketball player image) as candidate images for the thumbnail at block 915. If the comparisons to the other online media items should be used (block 911), processing logic locates the comparison results for the online media item in the data store at block 913 and returns to block 905 to identify the one or more criteria to use. For example, the criterion may be geography (e.g., country), and processing logic may determine from the comparison data (block 907) that users in a given country, such as Country-ABC, tend to complete watching a soccer video that is similar to the online media item that is undergoing a thumbnail recommendation analysis when presented with a thumbnail of a star soccer player, Player-123, from Country-ABC in the thumbnail who is interviewed in the video. Users in another country, such as Country-456, may tend to complete watching the soccer video when presented with a thumbnail of a star soccer player, Player-XYZ, from Country-456 in the thumbnail who is also in the video. Processing logic can identify one or more segments in the online media item that include Player-123, for example, from the segment feature data for the online media item, when publishing the soccer video to users in Country-ABC. Processing logic can identify one or more segments in the online media item that include Player-XYZ, for example, from the segment feature data for the online media item, when publishing the soccer video to users in Country-123. Processing logic can select one or more images of Player-123 or Player-XYZ from the one or more segments based on the configuration data. For example, processing logic may select an image from a segment that has a high consumption rate. At block 915, processing logic stores the selected images (e.g. Player-123 image, Player-XYZ image) in the data store as candidate images for the thumbnail for the online media item.

Figure 10:
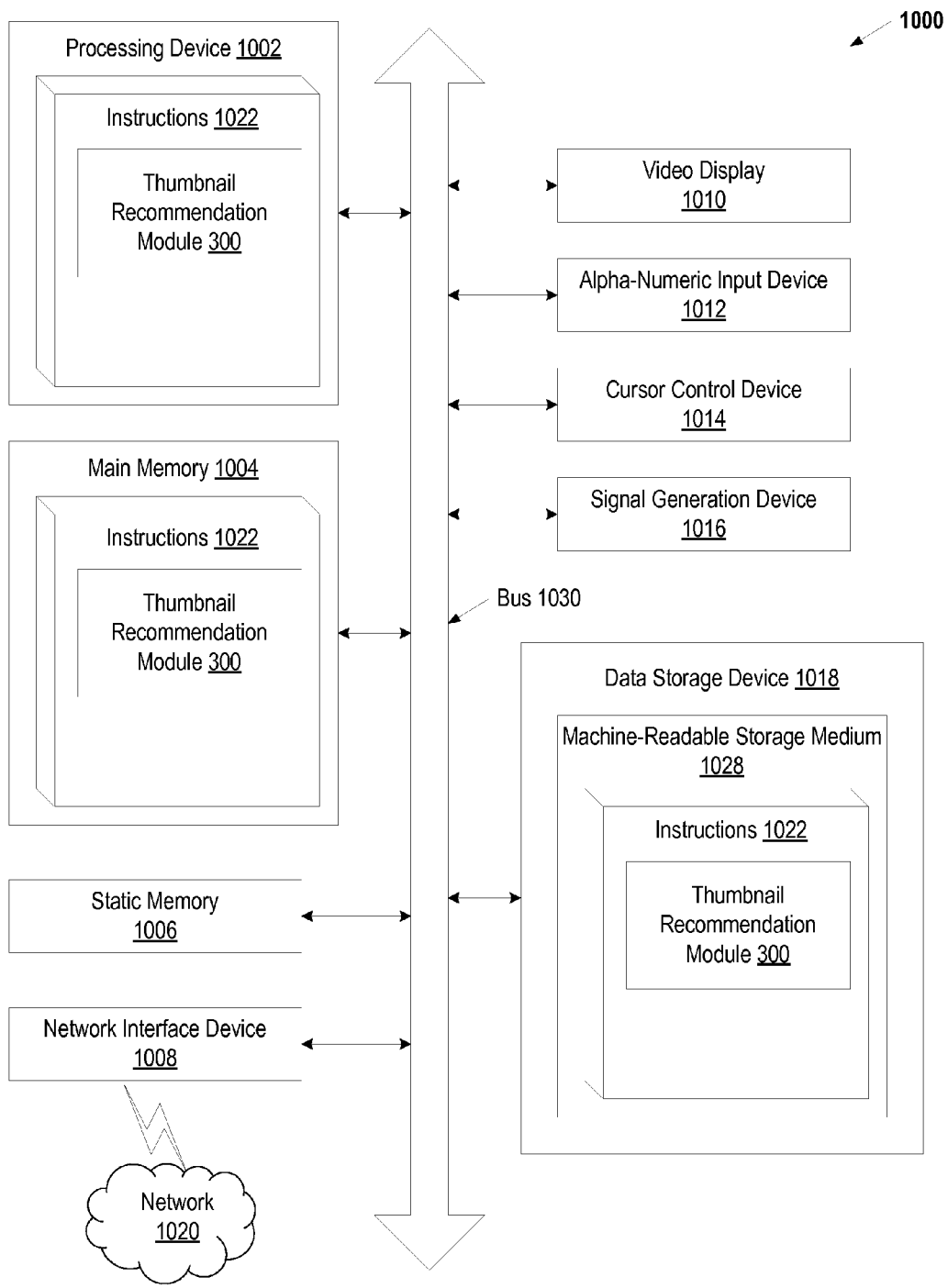
FIG. 10 is a block diagram of an example computer system that may perform one or more of the operations described herein, in accordance with various implementations.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device (processor) 1002, a main memory 1004 (e.g., read-only memory (ROM), flash memory, dynamic random access memory (DRAM) such as synchronous DRAM (SDRAM), double data rate (DDR SDRAM), or DRAM (RDRAM), etc.), a static memory 1006 (e.g., flash memory, static random access memory (SRAM), etc.), and a data storage device 1018, which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable storage medium 1028 on which is stored one or more sets of instructions 1022 (e.g., software) embodying any one or more of the methodologies or functions described herein. The instructions 1022 may also reside, completely or at least partially, within the main memory 1004 and/or within the processor 1002 during execution thereof by the computer system 1000, the main memory 1004 and the processor 1002 also constituting computer-readable storage media. The instructions 1022 may further be transmitted or received over a network 1020 via the network interface device 1008.

In one implementation, the instructions 1022 include instructions for a thumbnail recommendation module (e.g., thumbnail recommendation 300 of FIG. 3) and/or a software library containing methods that call the thumbnail recommendation module. While the computer-readable storage medium 1028 (machine-readable storage medium) is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "collecting", "selecting", "recommending", "determining," "publishing," "specifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    collecting, by a processor, user activity data for a first online media item, the user activity data comprising data for a plurality of users consuming the first online media item, the first online media item having a first thumbnail representing the first online media item, the first thumbnail corresponding to one of a plurality of frames of the first online media item;
    identifying, by the processor, rankings of the first online media item and at least one of a plurality of other online media items based on a comparison of the user activity data of the first online media item to user activity data of at least one of the plurality of other online media items;
    determining, by the processor, based on the rankings, that a new thumbnail is to be recommended for the first online media item;
    segmenting, by the processor, the first online media item into a plurality of segments;
    identifying, by the processor, one or more of the plurality of segments with user activity data satisfying one or more criteria, the identified segments comprising a set of frames of the plurality of frames of the first online media item;
    selecting, by the processor, a subset of frames from the set of frames of the identified segments;
    selecting, by the processor, one of the plurality of other online media items comprising a feature in common with the first online media item and having a second thumbnail representing the selected other online media item, the second thumbnail corresponding to one of a plurality of frames of the selected other online media item;
    selecting, by the processor, a frame from the subset of frames from the first online media item based on the second thumbnail for the selected other online media item; and
    sending, by the processor, a recommendation of the selected frame as the new thumbnail for the first online media item to a client device.

2. The method of claim 1, wherein the user activity data comprises measurements that are based on a point in time of using at least one frame of the plurality of frames of the first online media item as initial thumbnails for the first online media item.

3. The method of claim 1, wherein selecting the one of the plurality of other online media items comprises:
    comparing performance of the plurality of other online media items; and
    selecting the one of the plurality of other online media items based on the comparison of the performance of the plurality of other online media items.

4. The method of claim 1, wherein the one or more criteria comprise a drop-off rate, wherein the drop-off rate indicates a number of client devices consuming the first online media item at a first point in time and are no longer consuming the first online media item at a second point in time.

5. The method of claim 1, wherein collecting user activity data for the first online media item comprises:
    publishing the first online media item to a limited number of users using at least one of the plurality of frames as initial thumbnails for the first online media item; and
    collecting the user activity data from the limited number of users.

6. The method of claim 1, wherein selecting the subset of frames comprises:
    comparing the user activity data for the first online media item to the user activity data for the plurality of other online media items based on the one or more criteria.

7. The method of claim 1, wherein sending the recommendation of the selected frame as the new thumbnail for the first online media item further comprises:
    specifying one or more frames of the subset of frames to not use as the new thumbnail for the first online media item.

8. A system comprising:
    a memory; and
    a processor coupled with the memory to:
        collect user activity data for a first online media item, the user activity data comprising data for a plurality of users consuming the first online media item, the first online media item having a first thumbnail representing the first online media item, the first thumbnail corresponding to one of a plurality of frames of the first online media item;
        identify rankings of the first online media item and at least one of a plurality of other online media items based on a comparison of the user activity data of the first online media item to user activity data of at least one of the plurality of other online media items;
        determine, based on the rankings, that a new thumbnail is to be recommended for the first online media item;
        segment the first online media item into a plurality of segments;
        identify one or more of the plurality of segments with user activity data satisfying one or more criteria, the identified segments comprising a set of frames of the plurality of frames of the first online media item;
        select a subset of frames from the set of frames of the identified segments;
        select one of the plurality of other online media items comprising a feature in common with the first online media item and having a second thumbnail representing the selected other online media item, the second thumbnail corresponding to one of a plurality of frames of the second online media item;

select frame from the subset of frames from the first online media item based on the second thumbnail for the selected other online media item; and send a recommendation of the the selected frame as the new thumbnail for the online media item to a client device.

9. The system of claim 8, wherein the user activity data comprises measurements that are based on a point in time of using at least one frame of the plurality of frames of the first online media item as initial thumbnails for the first online media item.

10. The system of claim 8, wherein to select the one of the plurality of other online media items, the processor is to:

compare performance of the plurality of online media items; and select the one of the plurality of other online media items based on the comparison of the performance of the plurality of other online media items.

11. The system of claim 8, wherein the one or more criteria comprise a drop-off rate, wherein the drop-off rate indicates a number of client devices consuming the first online media item at a first point in time and are no longer consuming the first online media item at a second point in time.

12. The system of claim 8, wherein to collect user activity data for the first online media item, the processor is to:

publish the first online media item to a limited number of users using at least one of the plurality of frames as initial thumbnails for the first online media item; and collect the user activity data from the limited number of users.

13. The system of claim 8, wherein to select the subset of frames, the processor is to:

compare the user activity data for the first online media item to the user activity data for the plurality of other online media items based on the one or more criteria.

14. The system of claim 8, wherein to send the recommendation of the selected frame as the new thumbnail for the first online media item, the processor is to:

specify one or more frames of the subset of frames to not use as the new thumbnail for the first online media item.

15. A non-transitory computer readable storage medium encoding instructions thereon that, in response to execution by a processor, cause the processor to perform operations comprising:

collecting user activity data for a first online media item, the user activity data comprising data for a plurality of users consuming the first online media item, the first online media item having a first thumbnail representing the first online media item, the first thumbnail corresponding to one of a plurality of frames of the first online media item;

identifying rankings of the first online media item and at least one of a plurality of other online media items based on a comparison of the user activity data of the first online media item to user activity data of at least one of the plurality of other online media items;

determining based on the rankings, that a new thumbnail is to be recommended for the first online media item;

segmenting the first online media item into a plurality of segments;

identifying one or more of the plurality of segments with user activity data satisfying one or more criteria, the identified segments comprising a set of frames of the plurality of frames of the first online media item;

selecting a subset of frames from the more set of frames of the identified segments;

selecting one of the plurality of other online media items comprising a feature in common with the first online media item and having a second thumbnail representing the selected other online media item, the second thumbnail corresponding to one of a plurality of frames of the second online media item;

selecting a frame from the subset of frames from the first online media item based on the second thumbnail for the selected other online media item; and sending a recommendation of the selected frame as the new thumbnail for the first online media item to a client device.

16. The non-transitory computer readable storage medium of claim 15, wherein the user activity data comprises measurements that are based on a point in time of using at least one frame of the plurality of frames of the first online media item as initial thumbnails for the first online media item.

17. The non-transitory computer readable storage medium of claim 15, wherein selecting the one of the plurality of other online media items comprises:

comparing performance of the plurality of other online media items; and selecting the one of the plurality of other online media items based on the comparison of the performance of the plurality of other online media items.

18. The non-transitory computer readable storage medium of claim 15, wherein the one or more criteria comprise a drop-off rate, wherein the drop-off rate indicates a number of client devices consuming the first online media item at a first point in time and are no longer consuming the first online media item at a second point in time.

19. The non-transitory computer readable storage medium of claim 15, wherein collecting user activity data for the first online media item comprises:

publishing the first online media item to a limited number of users using at least one of the plurality of frames as initial thumbnails for the first online media item; and collecting the user activity data from the limited number of users.

20. The non-transitory computer readable storage medium of claim 15, wherein selecting the subset of frames comprises:

comparing the user activity data for the first online media item to the user activity data for the plurality of other online media items based on the one or more criteria.

* * * * *

UNITED STATES PATENT AND TRADEMARK OFFICE
CERTIFICATE OF CORRECTION

PATENT NO. : 9,591,050 B1  
APPLICATION NO. : 13/781255  
DATED : March 7, 2017  
INVENTOR(S) : Doug Sherrets et al.

Page 1 of 1

It is certified that error appears in the above-identified patent and that said Letters Patent is hereby corrected as shown below:

In Claim 15, Column 24, Line 9, delete "more"

Signed and Sealed this  
Nineteenth Day of June, 2018

Andrei Iancu  
*Director of the United States Patent and Trademark Office*